(12) United States Patent
Self et al.

(10) Patent No.: US 8,457,828 B2
(45) Date of Patent: Jun. 4, 2013

(54) REMOTE CONTROL MACHINE WITH PARTIAL OR TOTAL AUTONOMOUS CONTROL

(75) Inventors: Kelvin P. Self, Stillwater, OK (US); Nathan E. Kiner, Milford, NH (US)

(73) Assignee: The Charles Machine Works, Inc., Perry, OK (US)

( * ) Notice: Subject to any disclaimer, the term of this patent is extended or adjusted under 35 U.S.C. 154(b) by 1491 days.

(21) Appl. No.: 11/994,034

(22) PCT Filed: Jun. 27, 2006

(86) PCT No.: PCT/US2006/024998
§ 371 (c)(1),
(2), (4) Date: Mar. 5, 2008

(87) PCT Pub. No.: WO2007/002675
PCT Pub. Date: Jan. 4, 2007

(65) Prior Publication Data
US 2008/0208395 A1 Aug. 28, 2008

Related U.S. Application Data

(60) Provisional application No. 60/694,193, filed on Jun. 27, 2005, provisional application No. 60/694,285, filed on Jun. 27, 2005.

(51) Int. Cl.
*G05D 1/00* (2006.01)
(52) U.S. Cl.
USPC ............................. 701/24; 700/247
(58) Field of Classification Search
USPC ............... 180/401; 340/13.25, 13.2, 13.27, 340/12.5; 701/23, 24; 370/347; 455/349, 455/440; 700/247
See application file for complete search history.

(56) References Cited

U.S. PATENT DOCUMENTS

| | | | | |
|---|---|---|---|---|
| 3,639,755 A | * | 2/1972 | Wrege | 246/187 B |
| 5,006,988 A | * | 4/1991 | Borenstein et al. | 701/25 |
| 5,448,479 A | * | 9/1995 | Kemner et al. | 701/23 |
| 5,672,044 A | * | 9/1997 | Lemelson | 414/744.3 |
| 5,923,270 A | | 7/1999 | Sampo et al. | |
| 6,052,181 A | | 4/2000 | Maynard et al. | |
| 6,324,455 B1 | | 11/2001 | Jackson | |
| 7,164,970 B2 | * | 1/2007 | Wang et al. | 700/245 |
| 7,597,162 B2 | * | 10/2009 | Won | 180/9.32 |
| 2003/0147727 A1 | | 8/2003 | Fujishima et al. | |

(Continued)

FOREIGN PATENT DOCUMENTS

| DE | 19731749 A1 | 3/1999 |
|---|---|---|
| JP | 11165981 A1 | 6/1999 |

*Primary Examiner* — Thomas Black
*Assistant Examiner* — Sze-Hon Kong
(74) *Attorney, Agent, or Firm* — Tomlinson Rust McKinstry Grable

(57) ABSTRACT

A system for controlling a tool carrier and work tool from either a first remote control or a second remote control. The first remote control and the second remote control both transmit respective first and second control signals to a controller system supported on the tool carrier. The controller system is programmed to select either the first control signal or the second control signal to control operation of the tool carrier. The system may include programming to allow autonomous movement of the tool carrier between a first work zone and a second work zone. Further, the controller system may be programmed to avoid obstacles within its path and to reroute its path between the first work zone and the second work zone to avoid such obstacles.

37 Claims, 5 Drawing Sheets

U.S. PATENT DOCUMENTS

| | | | |
|---|---|---|---|
| 2004/0120305 A1* | 6/2004 | Aiken et al. | 370/347 |
| 2005/0026619 A1* | 2/2005 | Jha | 455/441 |
| 2007/0021871 A1* | 1/2007 | Wang et al. | 700/245 |
| 2012/0261204 A1* | 10/2012 | Won | 180/167 |

* cited by examiner

REMOTE CONTROL MACHINE WITH PARTIAL OR TOTAL AUTONOMOUS CONTROL

CROSS REFERENCE TO RELATED APPLICATIONS

This application claims the benefit of PCT Application Number PCT/US2006/024998, filed Jun. 27, 2006, which claims the benefit of U.S. Provisional Application No. 60/694,193 filed Jun. 27, 2005, the contents of which are incorporated herein by reference and U.S. Provisional Application No. 60/694,285 filed Jun. 27, 2005, the contents of which are incorporated herein by reference.

FIELD OF THE INVENTION

The present invention relates generally to the operation of a remote controlled tool carrier and in particular to a system for controlling operation and movement of the tool carrier using a plurality of remote controls.

SUMMARY OF THE INVENTION

The present invention is directed to a system for controlling operation of a tool carrier. The system comprises a first remote control, a second remote control, and a controller system. The first remote control is adapted to generate a first control signal. The second remote control is adapted to generate a second control signal. The controller system is supported on the tool carrier. The controller system is adapted to receive the first control signal and the second control signal and to select either the first control signal or the second control signal to the exclusion of the unselected control signal to control operation of the tool carrier.

The present invention further includes a method for controlling operation of a tool carrier. The method comprises transmitting a first control signal from a first remote control and transmitting a second control signal from a second remote control. Either the first control signal or the second control signal is selected to the exclusion of the unselected control signal to control operation of the tool carrier.

BRIEF DESCRIPTION OF THE DRAWINGS

FIG. 1 shows two operators using remote controls to control operation and movement of the tool carrier.

FIG. 3 illustrates the use of a signal transmitter positioned along a desired path of travel of the tool carrier.

DESCRIPTION OF THE INVENTION

Figure 1:
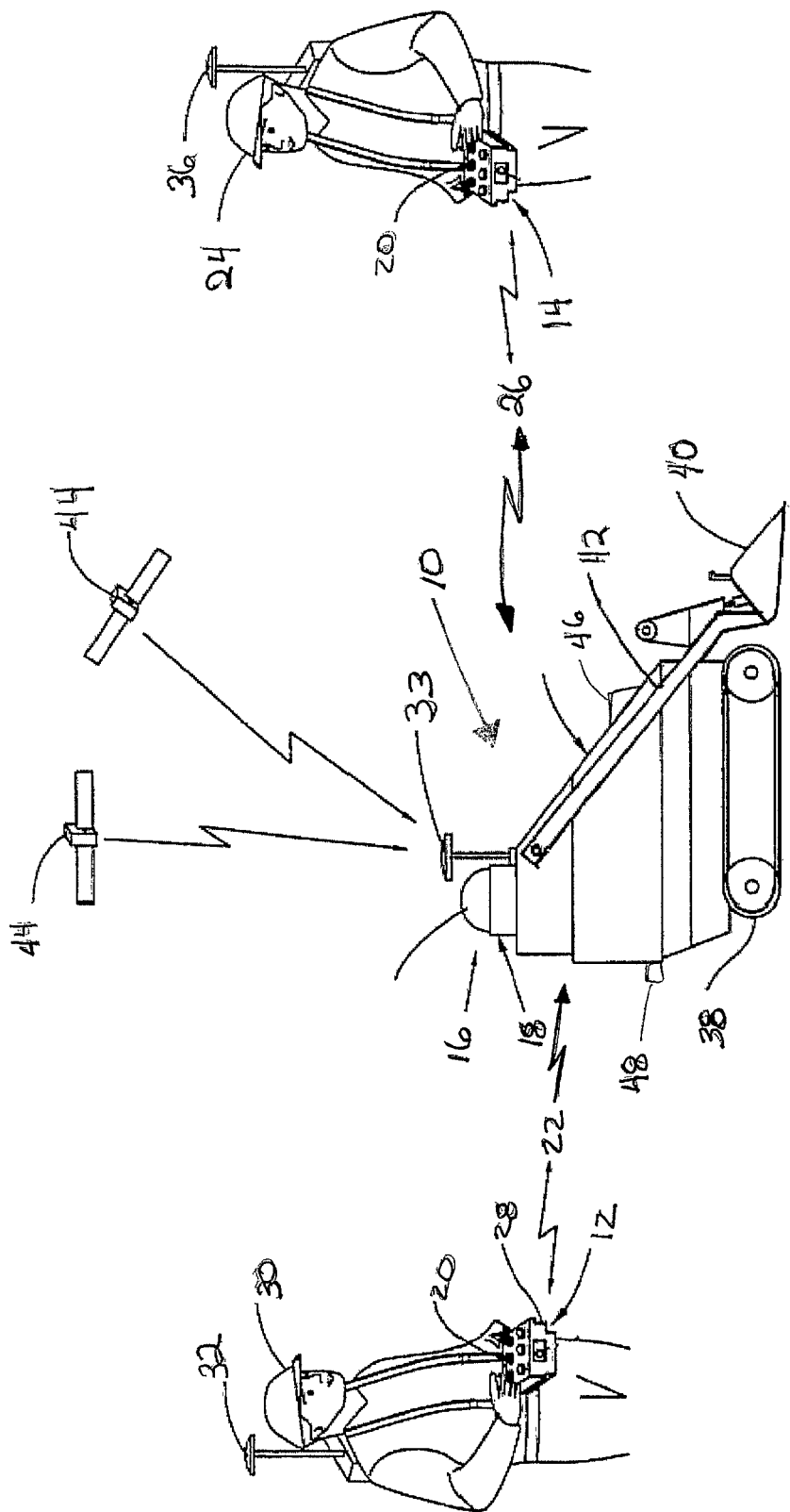
FIG. 1 is a diagrammatic representation of a system for controlling a tool carrier constructed in accordance with the present invention.

Turning now to the figures and first to FIG. 1, the general environment in which the apparatus and method of the present invention is used is illustrated. FIG. 1 shows a system for controlling operation of a tool carrier generally indicated by reference numeral 10. The system comprises a first remote control 12, a second remote control 14, an antenna assembly 16 supported by the tool carrier 10, and a controller system 18. The first remote control 12 has at least one user input device 20 and is adapted to generate a first control signal 22 in response to actuation of the user input device. The second remote control 14 may be used by a second operator 24 to generate a second control signal 26 by actuation of a user input device 20.

As mentioned above, the tool carrier 10 has an antenna assembly 16 adapted to receive the first control signal 22 and the second control signal 26 from the first remote control 12 and the second remote control 14, respectively. The antenna assembly 16 may comprise any one of the plurality of antenna assemblies disclosed in co-pending U.S. patent application Ser. No. 11/441,690 entitled Determination of Remote Control Operator Position filed May 26, 2006. One skilled in the art will appreciate that there are a wide variety of receiving antennas appropriate for use in the antenna assembly 16 of the present invention.

The controller system 18 is supported on the tool carrier and as will be discussed herein is adapted to control a wide variety of tool carrier 10 functions in response to the first control signal 22 and the second control signal 26.

Continuing with FIG. 1, the first operator is shown carrying the first remote control 12 having a plurality of user input devices 20. Such user input devices 20 may comprise manually operable knobs, buttons and joysticks and/or audio receiver supported on a portable frame 28. The portable frame 28 can be worn or carried by the first operator 30. The first remote control 12 may comprise a signal system having a signal generator (not shown). The signal generator of the first remote control 12 is adapted to generate the first control signal 22. One skilled in the art will appreciate that several commercially available remote controls would be appropriate for the purpose of generating the control signals 22 and 26. For example, the signal generator of the controls 12 and 14 may comprise a radio frequency signal or an ultrasonic signal generator adapted to transmit an ultrasonic control signal. The control signal may serve a wide variety of uses such as communicating a control command to the antenna assembly 16 or for determining the location of the remote control relative to the tool carrier as described in co-pending U.S. patent application Ser. No. 11/441,690 entitled Determination of Remote Control Operator Position, the contents of which are incorporated herein by reference. Additionally, the remote control system may comprise a global positioning satellite ("GPS") receiving antenna 32 wearable by the first operator 30. The GPS receiving antenna 32 may be used in cooperation with a tool carrier GPS receiving antenna 33 to determine the position of the first remote control 12 relative to the tool carrier 10.

The second operator 24 may also control operation of the tool carrier 10 using the second control signal 26 at the second location 34. The second remote control 14 may also comprise a GPS receiving antenna 36 used in cooperation with the tool carrier GPS receiving antenna 33 and the first remote control GPS receiving antenna 32 to determine the position of the remote controls relative to the tool carrier.

The tool carrier 10 shown in FIG. 1 may comprise a small loader with a track-laying undercarriage 38. Such a tool carrier is frequently utilized on construction and earthmoving work sites. The "tool carrier" classification implies that the tool carrier is adaptable to a variety of tasks through interchangeable work tools 40. Such a tool carrier 10 may be controlled in response to control signals 22 and 26 generated by the first remote control 12 and the second remote control 14, respectively. For purposes of illustration, the work tool 40 shown in FIG. 1 comprises a front-end loader bucket attachable to a movable arm 42 or other positioning mechanism. Other work tools may include trenchers, forks, a box blade or a backhoe. One skilled in the art will appreciate that a wide variety of machine types including skid steer loaders and tractors may be remotely controlled in accordance with the present invention.

The tool carrier 10 may comprise the antenna assembly 16 and a controller system 18. The antenna assembly 16 is supported by the tool carrier 10 and adapted to receive the first control signal 22 from the first remote control 12 and the second control signal 26 from the second remote control 14. The antenna assembly 16 may comprise a bi-directional communication system for communicating with both the first remote control 12 and the second remote control 14 and the GPS receiver 33. The GPS receiver 33 is capable of receiving signals from a plurality of GPS satellites 44. The first and second control signals 22 and 26 are detected by the antenna assembly 16 and processed by the controller system 18. The controller system 18 controls operation of the tool carrier 10 in response to either or both the first control signal 22 and the second control signal 26 and as described later herein, to autonomously control movement of the tool carrier along a predetermined path.

The tool carrier 10 may further comprise at least one obstacle avoidance sensor adapted to detect an obstacle disposed within or near the tool carrier's path of travel. The tool carrier 10 may have a forward obstacle avoidance sensor 46 to detect obstacles in front of the tool carrier and a rear obstacle avoidance sensor 48 to detect obstacles disposed behind the tool carrier. The obstacle avoidance sensors 46 and 48 may comprise acoustic sensor systems adapted to analyze the reflection of high frequency sound waves off of the obstacles or an RFID system to determine proximity of the obstacle to the tool carrier.

Figure 2:
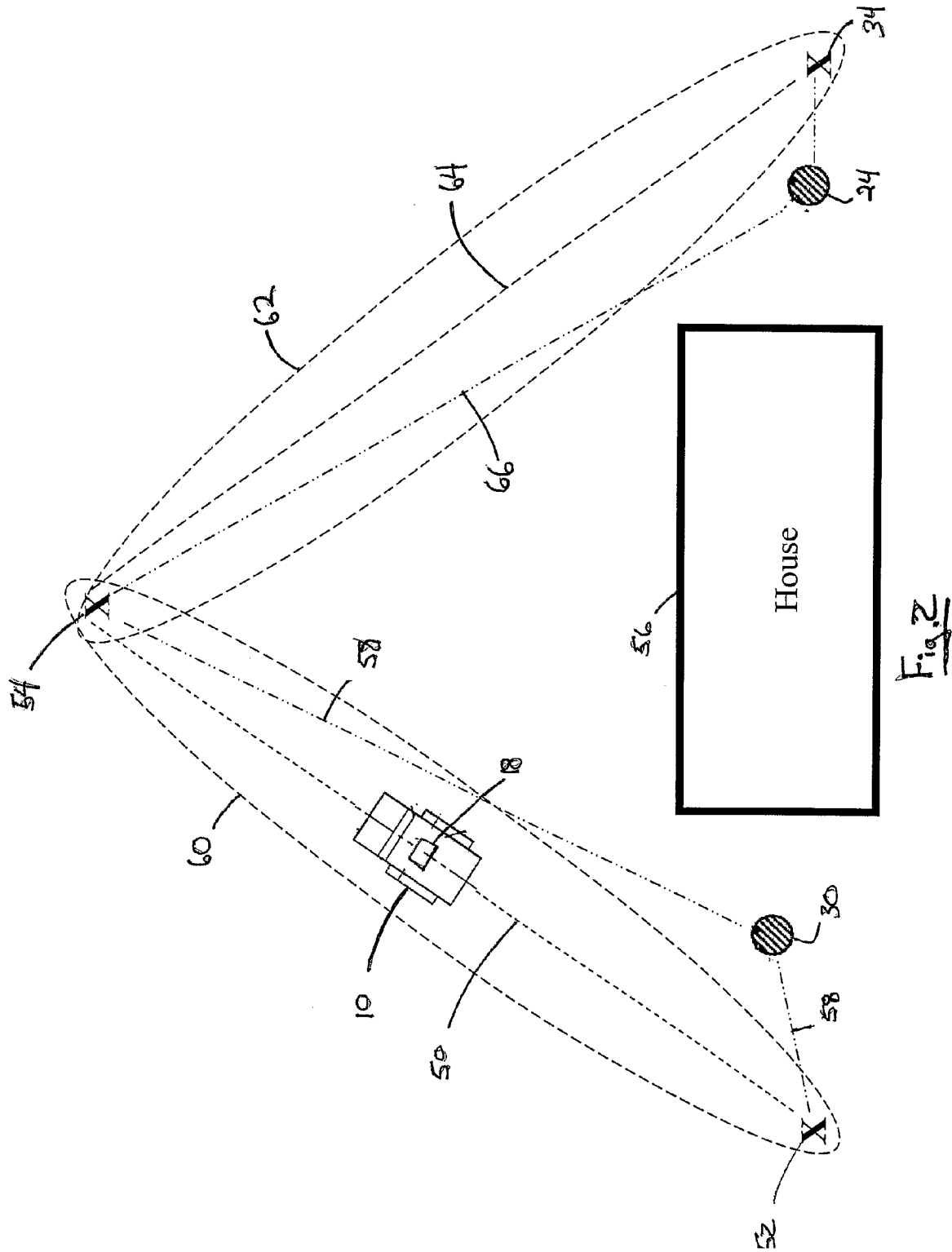
FIG. 2 is an overhead view of the remote controlled tool carrier of FIG. 1 showing a first and second operator disposed on opposing sides of a building.

Turning now to FIG. 2 the tool carrier 10 is shown moving along a first path 50 between a first location 52 and a hand-off point 54. As shown in FIG. 2 the first operator 30 may be positioned on the worksite on one side of a large obstruction such as a building 56. The first operator 30 may be positioned to have a clear line of sight 58 to the first location 52 and hand-off point 54. As used herein "hand-off point" may comprise any location where control of the tool carrier 10 may be transferred from the first remote control 12 to the second remote control 14 to control movement of the tool carrier along a second path 64 between the hand-off point and the second location 34.

The first operator 30 may control the tool carrier 10 within a first work area 60. The first work area may comprise the area directly around the first location 52. However, as shown in FIG. 2, the first work area may extend to the hand-off point where it may overlap with the second work area 62. The effective range of the control signal generated by the appropriate remote control may define the first work zone 60 and second work zone 62. Alternatively, the work zones may be defined by the physical characteristics of the jobsite. For example, the second work zone 62 may have a boundary situated at a point where the tool carrier 10 returns to the second operator's line of sight 66. However, one skilled in the art will appreciate that the shape and size of the work areas may vary considerably depending on the worksite and the presence of any buildings or obstacles without departing from the spirit of the present invention.

The first location 52 is disposed within the first work zone 60 within which the first operator 30 has control of the tool carrier 10. The second location 34 is disposed within the second work zone 62 within which the second operator 24 may have control of the tool carrier 10. In accordance with the present invention, the first and second operators 30 and 24 are not required to be in view of each other. Rather, the controller system 18 is adapted to determine which remote control may have control of the tool carrier 10 based upon a variety of factors discussed herein including the position of the tool carrier relative to the remote control.

In operation, the first control signal 22 may be selected by the controller system 18 when the tool carrier 10 is disposed at the first location 52 or within the first work zone 60. While present in the first work zone 60, the first operator 30 may control the tool carrier 10 with the first work signal 22 to perform a wide variety of activities such as excavating a jobsite or loading materials to be moved to another location. The first operator 30 may then move the tool carrier 10 along the first path 50 to the hand-off point 54. At the hand-off point 54 the first control signal 22 may be deselected by the controller system 18 and the second control signal 26 selected by the controller system to allow control of the tool carrier 10 by the second remote control 14 within the second work zone 62. In accordance with the present invention, the second control signal 26 may be selected by the controller system 18 to the exclusion of the first control signal 22 to reduce the likelihood of the first operator 30 interfering with operation of the tool carrier when the second operator has control. The system may also be adapted to require the operator 30 to actively relinquish control of the tool carrier 10 by deselecting the first control signal 22 on the remote control at the hand-off point 54.

Figure 3:
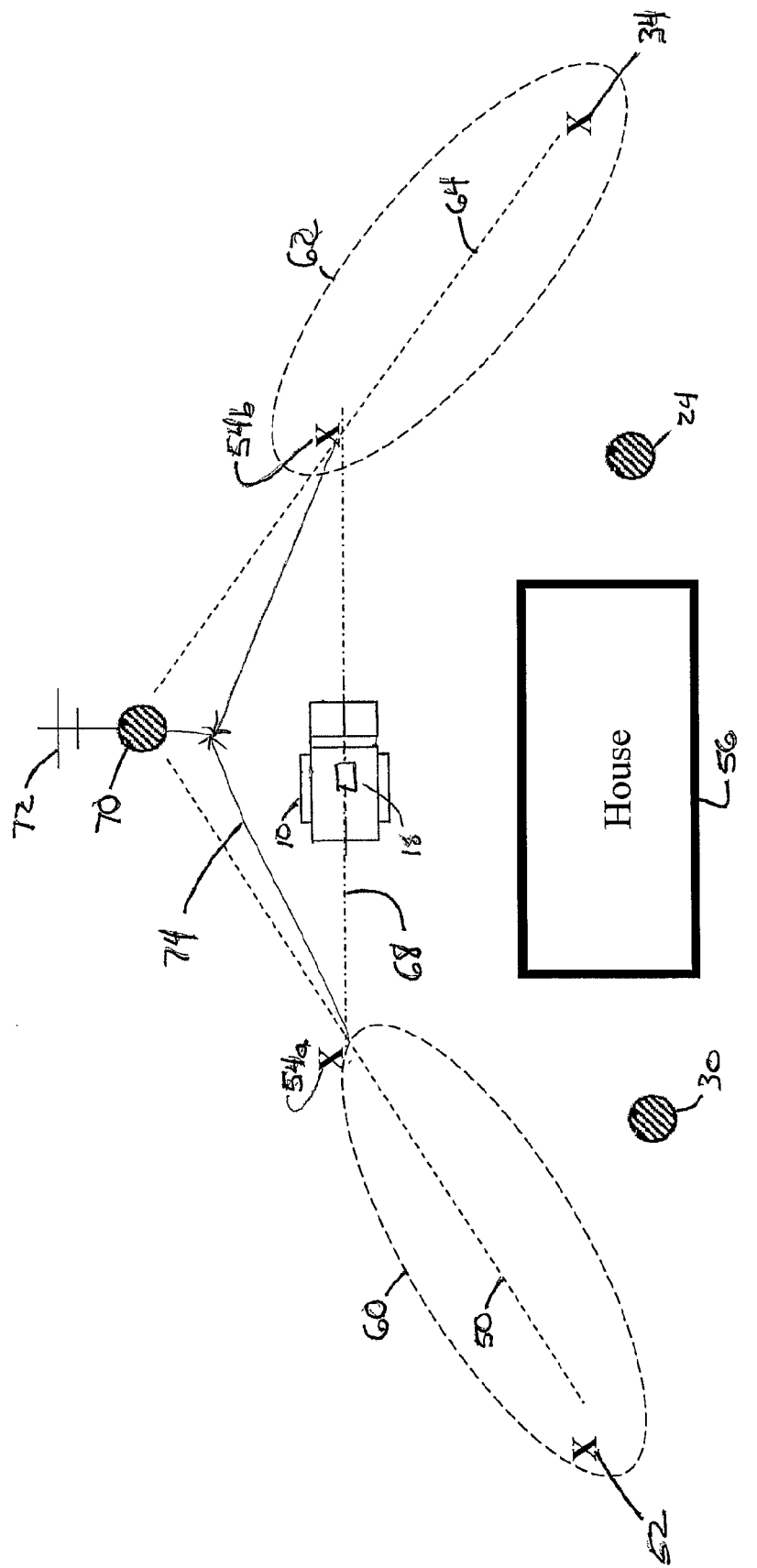
FIG. 3 is an overhead view of the remote controlled tool carrier shown in FIG. 1.

Turning now to FIG. 3 there is shown therein an alternative control system of the present invention wherein the tool carrier 10 is capable of autonomous movement between the first work zone 60 and second work zone 62. The tool carrier 10 is shown positioned on a predetermined path 68 near which the tool carrier may autonomously move between the first work zone 60 and the second work zone 62. As illustrated in FIG. 3 the controller system 18 of the present invention may further comprise a signal transmitter 70 positioned near the predetermined path 68. The signal transmitter 70 is adapted to transmit a reference signal to the controller system 18 to establish a path relative to the tool carrier 10 and the signal transmitter along which the tool carrier is steered toward the second work zone 62. Alternatively, the signal transmitter 70 may comprise a low-frequency beacon 72 adapted to transmit a homing signal to the controller system 18. Further, the signal transmitter 70 may direct a laser beam to the tool carrier to guide the carrier along the desired path.

In operation, the first operator 30 may use the tool carrier 10 within the first work zone 60 to complete a certain task. When the first operator 30 is finished with the task, the first operator may move the tool carrier 10 to a first hand-off point 54a. The first hand-off point 54a is shown in FIG. 3 outside the first work zone 60. However, the first hand-off point 54a may be located at a wide variety of points including within the first work zone 60. Upon arrival at the first hand-off point 54a, the controller system 18 may be programmed to take control of the tool carrier 10 to autonomously move the tool carrier along the predetermined path 68 to a second hand-off point 54b. Upon arrival at the second hand-off point 54b the second operator 24 may take control of the tool carrier 10 with the second remote control 14 (FIG. 1). When the second operator 24 is finished with the 10 tool carrier, the process may be reversed to move the tool carrier back to the first hand-off point 54a to give control back to the first operator 30.

In a preferred embodiment, the controller system 18 may use the previously described GPS receiving antenna 33 disposed on the tool carrier 10 to guide the tool carrier along the predetermined path 68 between the first hand-off point 54a and the secondhand-off point 54b. The controller system 18 comprising the GPS receiving antenna 33 may be programmed to follow the predetermined path 68 by moving the tool carrier 10 along the predetermined path under the control of either the first remote control 12 or the second remote control 14 and recording and storing several GPS coordinate measurements taken along the desired path. The controller system 18 may then use the position measurements to autonomously move the tool carrier 10 between the first work zone 60 and the second work zone 62 as desired by the operators.

Alternatively, the signal transmitter 70 may be stationed on the worksite to transmit a reference signal to the controller system 18 for establishing a path 74 along which the tool carrier 10 may be steered. The reference signal transmitted by the signal transmitter 70 may comprise a radio-frequency signal or a laser beam directed to a laser beam receiver (not shown) supported on the tool carrier 10 and operatively connected to the controller system 18. The laser receiver and controller system 18 may be configured to steer the tool carrier 10 along a laser path (not shown) defined by the path of the laser beam received at the tool carrier. In such case, the controller system 18 could be adapted to move the tool carrier 10 in a variety of directions to maintain contact with the laser beam transmitted from the signal transmitter 70.

It will be appreciated by one skilled in the art that a plurality of signal transmitters 70 may be utilized on the work site to coordinate autonomous movement of the tool carrier 10 over extended distances or along a path comprising many turns. For example, the plurality of signal transmitters 70 may comprise the previously described GPS system adapted to coordinate movement of the tool carrier 10 between the first work zone 60 and the second work zone 62.

Figure 4:
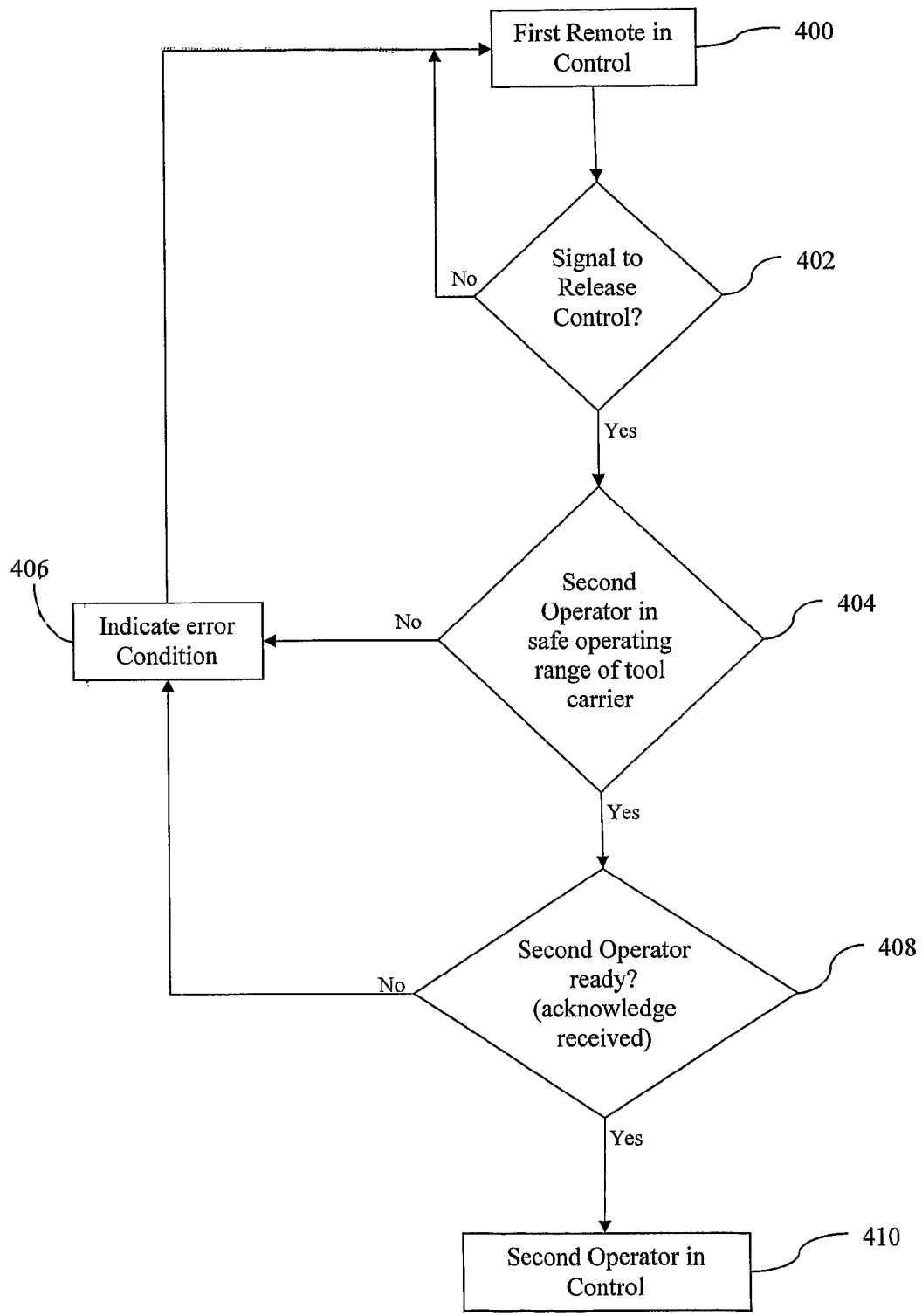
FIG. 4 is a flow chart illustrating a process for exchanging control from a first remote control to a second remote control.

Referring now to FIGS. 2, 3, and 4 and by way of example only, the first work zone 60 may comprise the front yard of a house 56. The first operator 30 may control the tool carrier 10 (Step 400) within the first work zone 60 to, for example, pickup a pallet of sod, then drive the tool carrier 10 to the hand-off point 54. At the hand-off point 54 the first operator 30 relinquishes control of the tool carrier 10. Relinquishing control of the tool carrier 10 may comprise sending a release signal (Step 402) from the first remote control 12. At the hand-off point 54, the second operator 24 may notice that the tool carrier 10 has come into view and take control of the tool carrier 10 if he is within safe operating range of the tool carrier (Step 404). If the second operator 24 is not within safe operating range, an error condition may be indicated (Step 406) and control is returned to the first operator 30. If the second operator 24 is within a safe range and acknowledges he is ready to take control of the tool carrier (Step 408), the second operator is given control (Step 410) by the controller system 18. Once the second operator 24 has control, the tool carrier may be driven to the second work zone 62, where a work crew might be laying out the sod in the backyard of the house 56.

After the second operator 24 completes his work in the second work zone 62 he may reverse the process by maneuvering the tool carrier 10 back to the hand-off point 54 and relinquish control of the tool carrier to the first operator 30.

In an alternative mode of operation, control of the tool carrier 10 may be limited to one operator at any one time. In such case, the first operator 30 would purposefully relinquish control of the tool carrier 10 before the second operator 24 is allowed to take control of the tool carrier 10 with the second remote control 14 and vice-a-versa. Accordingly, whichever operator has control of the tool carrier 10 will maintain control until purposefully relinquishing it to another operator by transmitting a relinquishment command from the remote control. For example, to pass control from the first remote control 12 to the second remote control 14, the first operator 30 may turn off a switch 20 on the first remote control 12 to release active control. The second operator 24 may then activate a similar switch 20 on the second remote control 14 to gain control of the tool carrier 10 and would possess control until the switch on the second remote control was turned off.

Other methods to relinquish control could be envisioned, such as releasing an operator presence system on the tool carrier 10. In such case the first operator to activate the operator presence switch on either the first remote control 12 or second remote control 14 would possess control of the tool carrier 10 until relinquished.

Alternatively, the controller system 18 may be configured to make decisions regarding control of the tool carrier 10 based upon: the strength of the control signal received at the antenna assembly 16, the respective location of the first remote control 12 and the second remote control 14 relative to the tool carrier, or a preprogrammed set of parameters established so that the first control signal 22 has priority over the second control signal 26. Further, the controller system 18 may be configured to select both the first control signal 22 and the second control signal 26 when multiple operators are needed to control movement of the tool carrier 10 and operation of the work tool 40 at the same time.

Possessing control of the tool carrier 10, as previously discussed, may comprise several steps and requirements before control is allowed. For example, if the first operator 30 is attempting to control the tool carrier 10 with the first remote control 12, the tool carrier must recognize the first control signal 22 before operation of the tool carrier is allowed.

The controller system 18 may be configured to allow or accept input from only one of the remote controllers at a time. Thus, the controller system 18 would reject or ignore signals from any and all other remote controls during operation, even those that at another time could be allowed to operate the tool carrier 10. However, the controller system 18 may be configured to accept an Emergency Stop or Shutdown signal from any or all remote controls regardless of which remote control is presently in control of the tool carrier 10.

The first control signal 22 and second control signal 26 may each comprise a unique identifier used by the controller system 18 to identify the source of the control signal received by the antenna assembly 16. The unique identifier may comprise a specific frequency, that once established is the only frequency that can carry signals to operate the tool carrier 10. An alternate method could use a standard communication frequency that could include the unique identifier as part of each instruction packet communicated to the controller system 18. For example, when the first operator 30 has control of the tool carrier 10, control rests with the first operator until he purposefully relinquishes control and the controller system 18 would reject all other inputs not containing the unique identifier.

One skilled in the art will appreciate that when certain tool carriers 10 are configured for specialized applications, such as trenching, it may be beneficial for the first remote control 12 to serve as a primary controller adapted to take control of the tool carrier 10 from any secondary remote controls. Additionally, one skilled in the art can appreciated that the controller system 18 may be configured to allow shared control of the tool carrier for certain operations of the tool carrier. Such a configuration may be useful in instances where a single operator may have difficulty controlling both ground drive 38 and work tool 40 functions.

If the tool carrier 10 is adapted to determine the position of each operator relative to the tool carrier, other rules could be applied by the controller system 18 to manage operation of the tool carrier. For example, the controller system 18 may be programmed to stop function of the work tool 40 or stop movement of the tool carrier 10 where any unauthorized operator or work crew member enters either the first work zone 60 or the second work zone 62. For example, if the first operator 30 is operating the tool carrier 10 with a trencher attached and the second operator 24 enters into a predetermined exclusion zone or work zone, the controller system 18 may activate its prescribed response such as stopping work tool function or shutting down the tool carrier.

Figure 5:
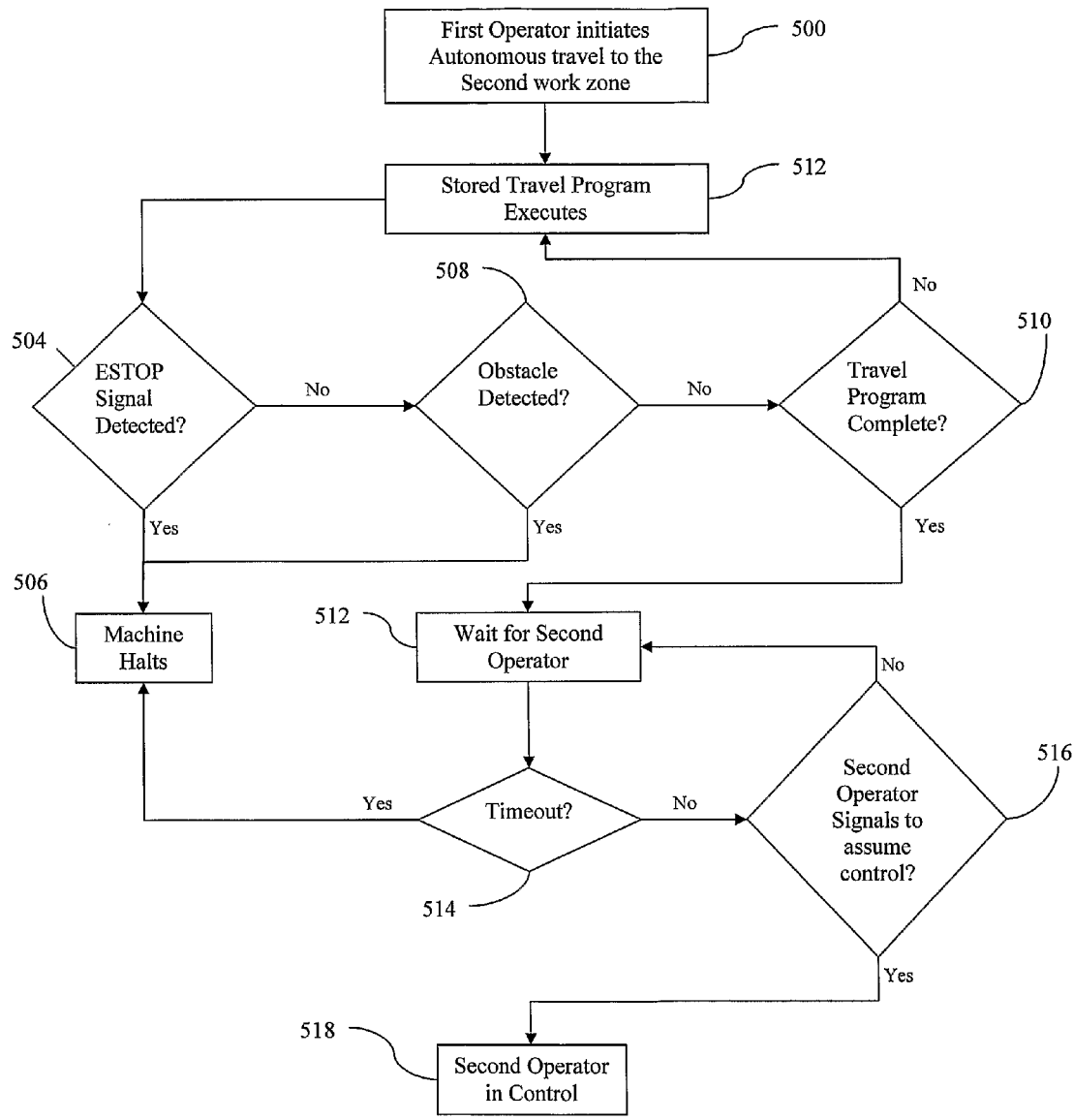
FIG. 5 is a flow chart illustrating a process for exchanging control between a first remote control and a second remote control. The flow chart of FIG. 5 includes steps for autonomous movement of the tool carrier along a predetermined path.
Figure 1:
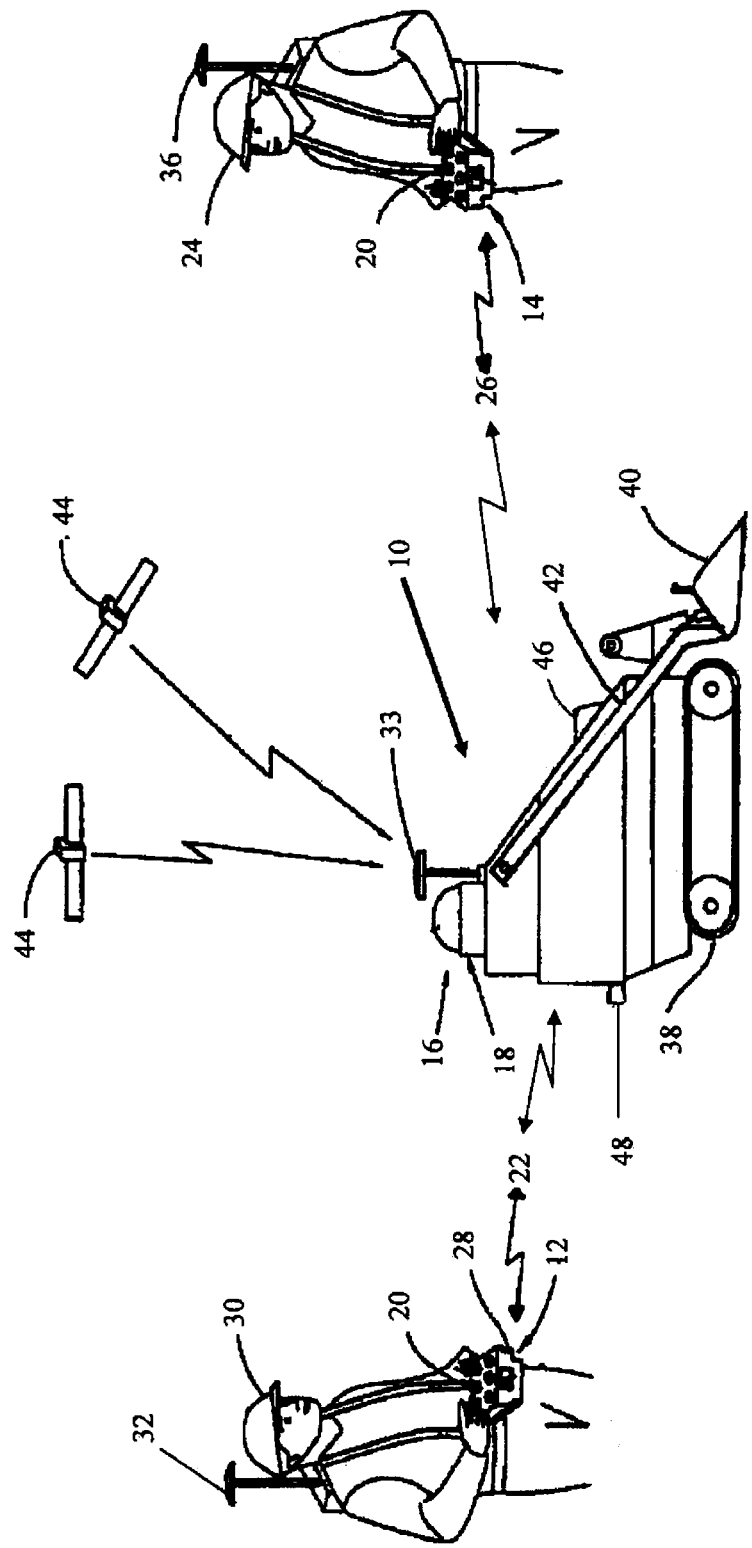
Figure 2:
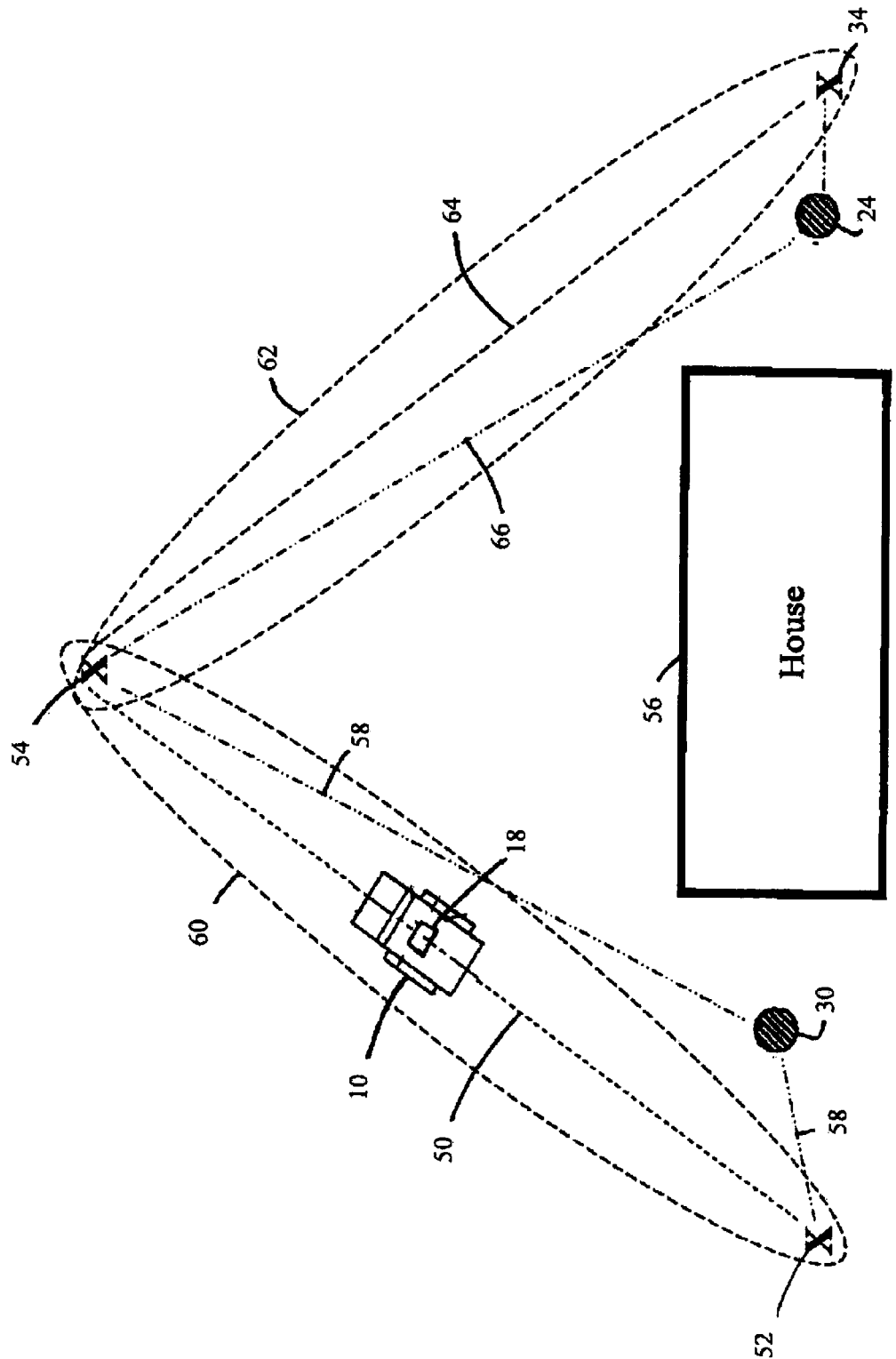
Figure 3:
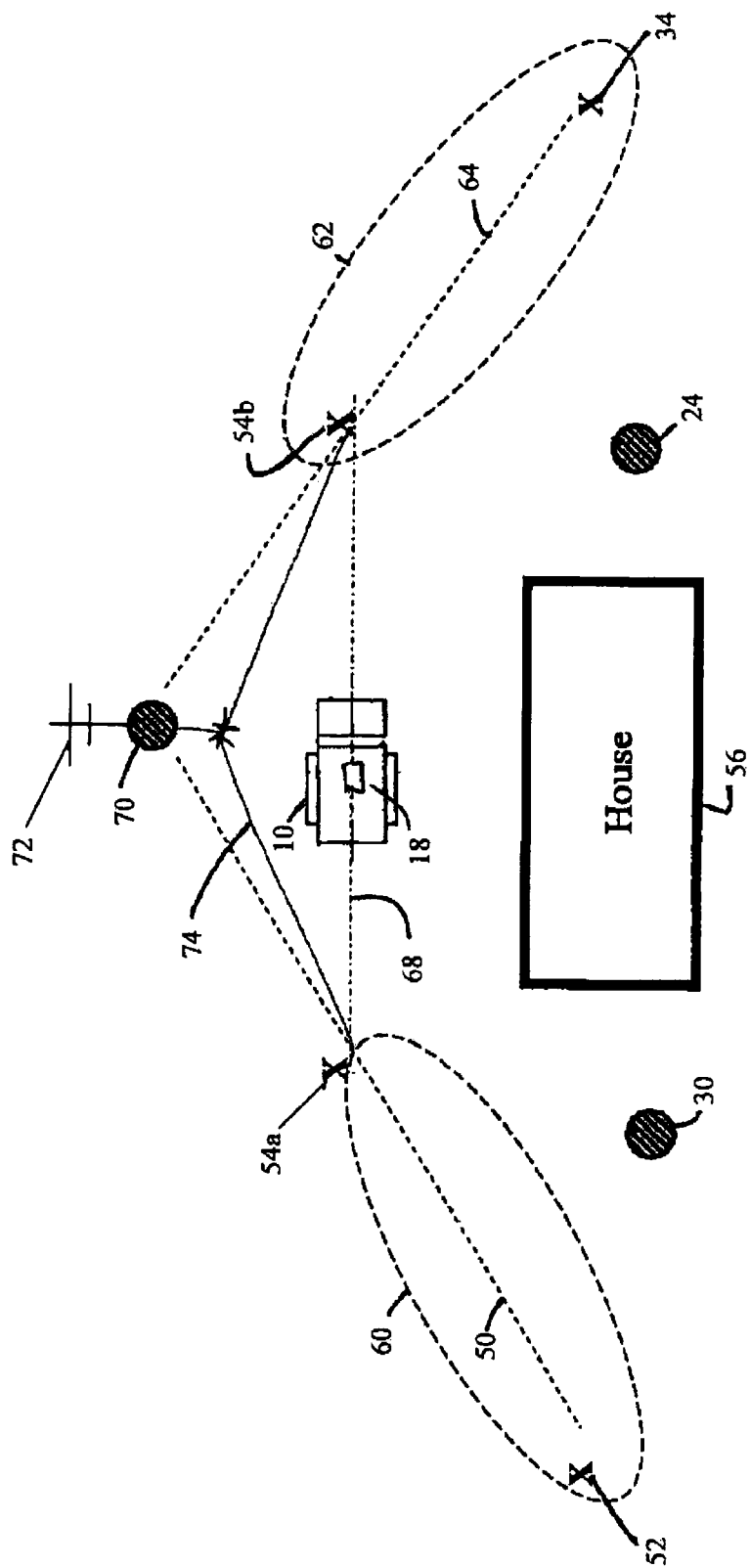
Figure 4:
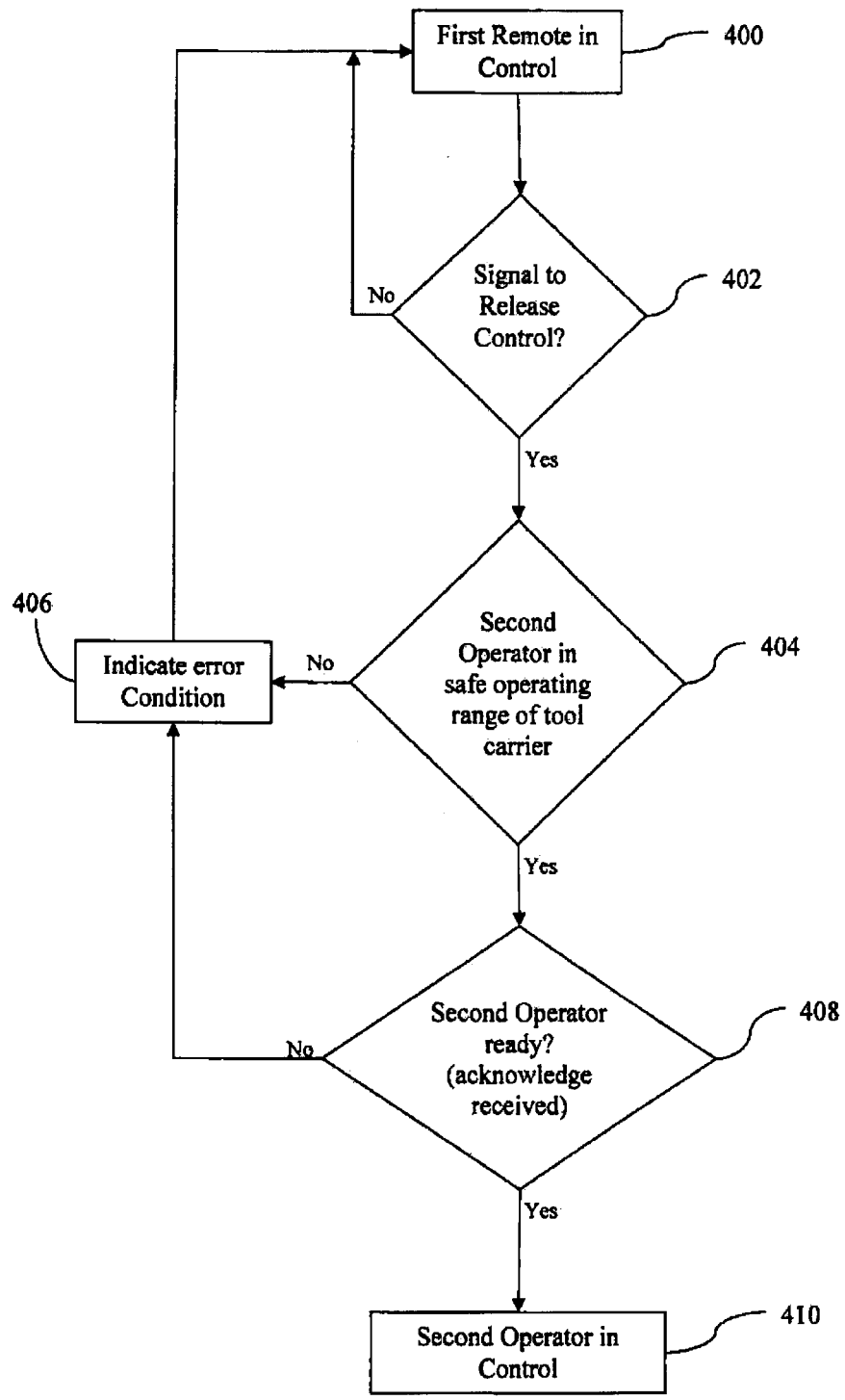
Figure 5:
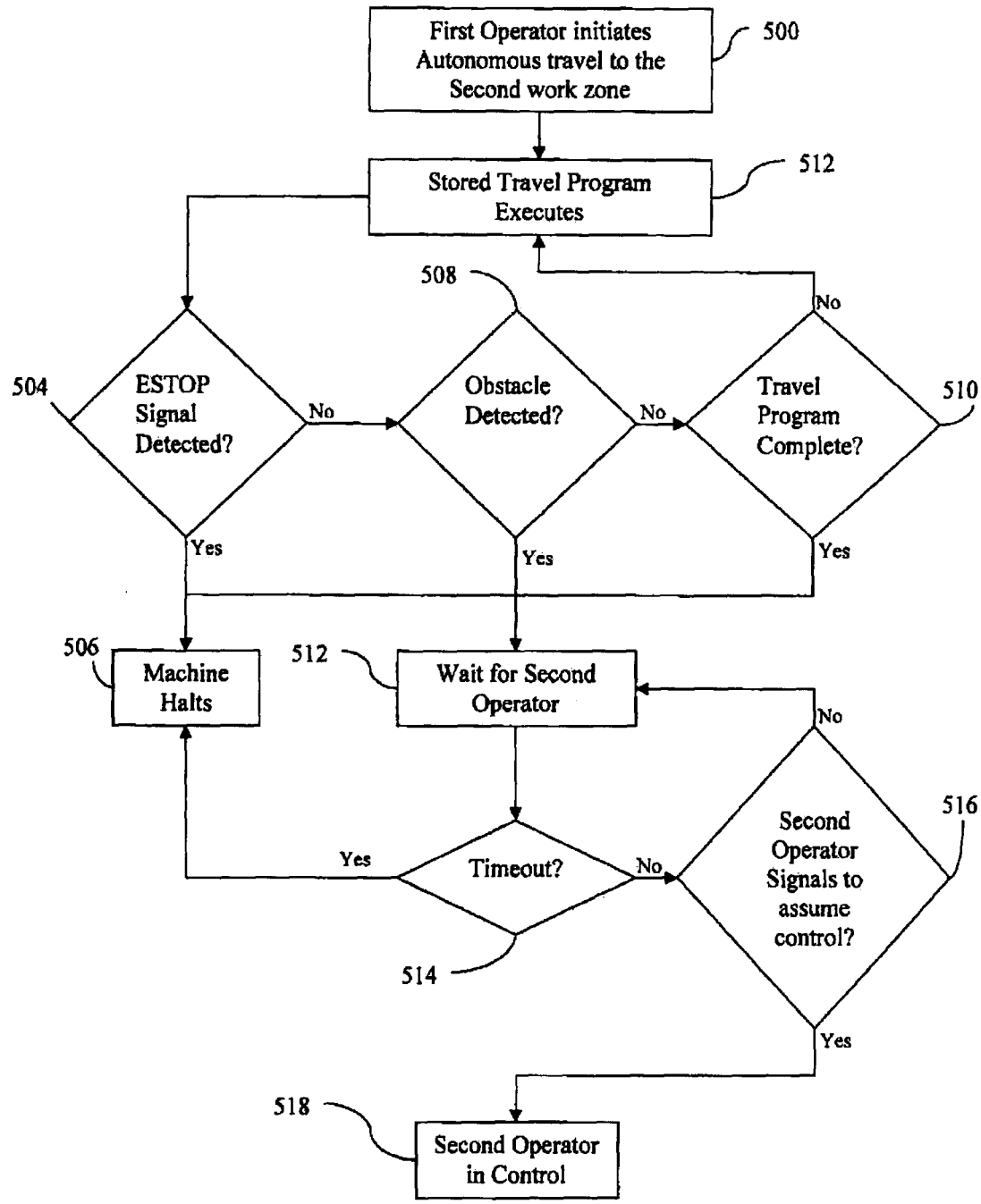

Continuing with FIG. 5, the first operator 30 may move the tool carrier 10 to the first hand-off point 54a and initiate autonomous movement of the tool carrier to the second hand-off point 54b (Step 500). At this point, the first operator 30 could turn his focus to other tasks necessary around the vicinity of the worksite while waiting for the tool carrier to return. The controller system 18 takes control of the tool carrier and executes the stored travel program (Step 502). As the tool carrier travels the predetermined path 68, the operators may have the ability to issue an emergency stop signal (Step 504) to the controller system 18. If an emergency stop signal is detected by the controller system 18 operation of the tool carrier 10 may be halted (Step 506).

If no emergency stop signal is detected the tool carrier may continue along the predetermined path 68. Obstacle avoidance sensors 46 and 48 may be activated to detect any obstacles (Step 508) disposed within the predetermined path 68. If an obstacle is detected by sensors 46 or 48, the controller system 18 may halt movement of the tool carrier (Step 506) or alter the predetermined path 68 to avoid the obstacle and proceed to the pre-programmed destination point. In the event that no obstacles are detected or after the path is altered to avoid any obstacles, the tool carrier will continue its travel program. Execution of the stored travel program will continue until completed by arrival of the tool carrier 10 at the second hand-off point 54b (Step 510).

Autonomous movement of the tool carrier 10 along the predetermined path 68 could be controlled in several different ways. If signal transmitters 70 are placed along the path 68, then the tool carrier 10 would use them as reference points as it travels along the predetermined path. Since the tool carrier 10 could discern its position relative to these fixed signal transmitters 70, it could follow a path relative to these positions. Alternatively, the previously described GPS, laser based system or other could be used to provide adequate location information for autonomous operations. For most of the autonomous operations described herein, very fine positioning is not required and the tool carrier 10 may simply travel an approximate path between points 54a and 54b.

Upon arrival at the second hand-off point 54b, the tool carrier 10 will wait for the second operator 24 to take control (Step 512). The controller system 18 may provide the second operator a certain interval of time to take control of the tool carrier 10 (Step 514) or the tool carrier will be halted (Step 506). If the second operator 24 transmits the second control signal 26 (Step 516) before time expires the second operator may then have control of the tool carrier (Step 518) until the second operator actively relinquishes control or control is taken by a dominant control signal.

The tool carrier 10 may posses a learn mode of operation. The purpose of the learn mode is to teach or store in memory the predetermined path 68 such that the tool carrier 10 could repeat that path as needed. The computer program within the controller system 18 would control this process. As discussed previously herein, one way to accomplish this path storage is to enable a learn mode within the tool carrier 10 and then physically and manually drive the tool carrier along the desired path, storing positional and operational information along the way. Depending on complexity of the learn mode, one could envision programming the controller system 18 to change engine speed, valve displacements, attachment positions, ground drive speeds, orientation and directions, etc. based upon the position of the tool carrier along the predetermined path 68. Although only one tool carrier 10 is used in the previous example, one could envision two or more tool carriers being used simultaneously.

In an alternative embodiment the predetermined path 68 may comprise a preprogrammed path for the tool carrier 10 to follow for testing. In this case the tool carrier 10 would be trained to travel a continuous path, generally in a closed shape such as a circle. The tool carrier 10 would travel the same route over and over again and correct back to path if it is perturbed from its predefined path. The tool carrier 10 would continue to operate in this fashion until a fixed number of cycles or time was reached. The controller system 18 would likely have a pre-programmed interruption mechanism for stopping the test prematurely and would have fixed limits on path deviation such that if exceeded would stop the test and await further instruction. This testing could also include elements where operating conditions of the tool carrier such as engine temperature could be monitored and if exceeded, the test would halt. Also one could envision any number of ways to monitor the test and allow a test technician to control and modify as necessary. In some situations, the test could be continuously monitored such that an operator is required only to maintain an enable mode at the remote control to allow the tool carrier 10 to operate.

A third variation is for the situation where the tool carrier 10 is operating in the same manner for an extended period of time while following the predetermined path. This would be the case for a trencher or rock saw operating very slowly. In this case the tool carrier 10 would be set up and operations started. Once steady operation was achieved the operator would initiate a "cruise" control option to allow the tool carrier 10 to continue operation for as long as the operator transmits an enable signal from the remote control. During operation small changes in operation could be initiated to optimize operation. Once the tool carrier 10 nears its destination the operator can take over full control of the tool carrier 10 to finalize the operation. Certainly combinations of the above concepts could also apply.

Various modifications can be made in the design and operation of the present invention without departing from the spirit thereof. Thus, while the principal preferred construction and modes of operation of the invention have been explained in what is now considered to represent its best embodiments, which have been illustrated and described, it should be understood that within the scope of the appended claims, the invention may be practiced otherwise than as specifically illustrated and described.

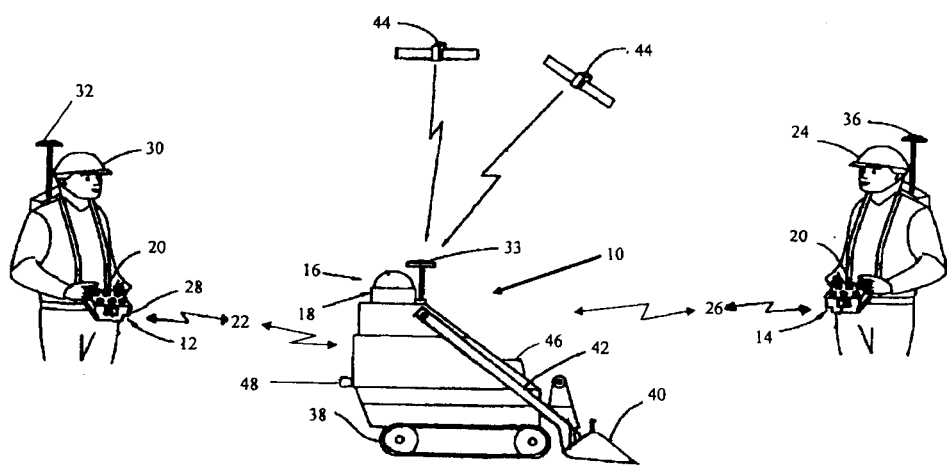

What is claimed is:

1. A system for controlling operation of a tool carrier, the system comprising:

a first remote control configured to generate a first control signal comprising a frequency specific to the first remote control;

a second remote control configured to generate a second control signal; and a controller system supported on the tool carrier; wherein the controller system is configured to receive the first control signal and the second control signal and to select either the first control signal or the second control signal to the exclusion of the unselected control signal to control operation of the tool carrier;

wherein the first control signal comprises an enable signal configured to enable autonomous control of the tool carrier by the controller system.

2. The system of claim 1 wherein the tool carrier comprises an obstacle avoidance system adapted to detect an obstacle to tool carrier transportation.

3. The system of claim 2 wherein the obstacle avoidance system comprises an acoustic sensor system.

4. The system of claim 1 wherein the first control signal comprises a first remote control relinquishment command.

5. The system of claim 1 wherein both the first remote control and the second remote control are further adapted to transmit a shutdown command signal to the controller system to shutdown operation of tool carrier regardless of selection of the first control signal or the second control signal by the controller system.

6. The system of claim 1 wherein the controller system is configured to allow the first control signal to take control of the tool carrier when the first control signal is received by the controller system when the second control signal is selected by the controller system.

7. The system of claim 1 wherein the tool carrier comprises a work tool operatively supported thereon; wherein the second control signal is selected to control operation of the work tool.

8. The system of claim 1 wherein either the first control signal or the second control signal is selected by the controller system based upon the location of the first remote control and the second remote control relative to the tool carrier.

9. The system, of claim 1 wherein the tool carrier comprises a work tool operatively connected to the tool carrier and wherein the controller system is adapted to autonomously control operation of the tool carrier and the work tool along a predetermined path.

10. The system of claim 1 further comprising a plurality of signal transmitters, wherein the signal transmitters are each adapted to transmit a positioning signal to the controller system for establishing a path, along which the tool carrier is steered.

11. The system of claim 10 wherein the plurality of signal transmitters each comprise a global positioning system.

12. The system of claim 10 wherein the positioning signal transmitted by each of the plurality of signal transmitters comprises a laser beam.

13. The system of claim 1 wherein the controller system is adapted to record movement of the tool carrier along a path and to autonomously move the tool carrier along the recorded path.

14. A system for controlling operation of a tool carrier, the system comprising:

a first remote control configured to generate a first control signal;

a second remote control configured to generate a second control signal; and a controller system supported on the tool carrier; wherein the controller system is configured to receive the first control signal and the second control signal and to select either the first control signal or the second control signal to the exclusion of the unselected control signal to control operation of the tool carrier;

wherein the first control signal is selected when the tool carrier is at a first work zone and wherein the second control signal is selected when the tool carrier is at a second work zone.

15. The system of claim 14 wherein the first work zone and the second work zone overlap.

16. The system of claim 14 wherein the controller system is further adapted to autonomously control movement of the tool carrier along a predetermined path between the first work zone and the second work zone.

17. The system of claim 16 further comprising a signal transmitter positioned along the predetermined path; wherein the signal transmitter is adapted to transmit a reference signal to the controller system for establishing a path relative to the tool carrier and the signal transmitter along which the tool carrier is steered toward the second work zone.

18. The system of claim 14 wherein the controller system comprises a global positioning system.

19. The system of claim 18 wherein the global positioning system is adapted to guide the tool carrier along a path between the first work zone and the second work zone.

20. The system of claim 18 wherein the controller system is adapted to select either the first control signal or the second control signal based on the location of the tool carrier determined using the global positioning system.

21. A method for controlling operation of a tool carrier, the method comprising:

transmitting a first control signal from a first remote control;

transmitting a second control signal from a second remote control; and selecting either the first control signal or the second control signal to the exclusion of the unselected control signal to control operation of the tool carrier; and selecting the first control signal when the tool carrier is in a first work zone.

22. The method of claim 21 further comprising selecting the second control signal when the tool carrier is in a second work zone.

23. The method of claim 22 further comprising autonomously moving the tool carrier along a path between a first hand-off point and a second hand-off point.

24. The method of claim 22 further comprising:

moving the tool carrier along a path between a first hand-off point and a second hand-off point;

recording movements of the tool carrier along the path; and autonomously moving the tool carrier along the path using the recorded movements.

25. The method of claim 24 further comprising automatically altering the path to avoid an obstacle disposed within the path.

26. The method of claim 25 wherein autonomously moving the tool carrier along the path, further comprises:

transmitting a positioning signal to the tool carrier to establish a path between the tool carrier and a point located along the path; and steering the tool carrier toward the point located along the path.

27. The method of claim 22 wherein moving the tool carrier to the second work zone comprises positioning the tool carrier at a hand-off point and selecting the deselected control signal to take control of the tool carrier.

28. The method of claim 21 wherein the second control signal is selected to the exclusion of the first control signal when the second control signal is detected at the tool carrier.

29. The method of claim 21 wherein the first control signal is selected to the exclusion of the second control signal when the first control signal is detected at the tool carrier.

30. The method of claim 21 further comprising deselecting the first control signal by relinquishing control of the tool carrier at the first remote control.

31. The method of claim 21 further comprising:
operating the tool carrier in a first work zone in response to the first control signal;
moving the tool carrier to a first hand-off point:
autonomously moving the tool carrier from the first hand-off point to a second hand-off point;
selecting the second control signal when the tool carrier is at the second hand-off point; and
operating the tool carrier at a second work zone in response to the second control signal.

32. The method of claim 21 further comprising transmitting a shutdown signal from either the first remote control or the second remote control.

33. The method of claim 21 wherein the first control signal is selected to control operation of the tool carrier.

34. The method of claim 33 further comprising deselecting the first control signal and selecting the second control signal.

35. The method of claim 34 wherein the first control signal has priority over the selected second control signal.

36. The method of claim 33 wherein selecting the first control signal comprises receiving a unique identifier carried by the first control signal.

37. The method of claim 21 wherein the tool carrier comprises a work tool, the method comprising selecting the second control signal to control operation of the work tool.

* * * * *

UNITED STATES PATENT AND TRADEMARK OFFICE
CERTIFICATE OF CORRECTION

PATENT NO. : 8,457,828 B2  
APPLICATION NO. : 11/994034  
DATED : June 4, 2013  
INVENTOR(S) : Self et al.

Page 1 of 7

It is certified that error appears in the above-identified patent and that said Letters Patent is hereby corrected as shown below:

Delete the title page showing an illustrative figure, and substitute the attached title page therefor.

In the Drawings:
Delete drawing sheets 1-5 and substitute the attached drawing sheets therefor.

In the Specifications:
Column 5, line 7, please insert a space between "second" and "hand-off".

Signed and Sealed this
Sixteenth Day of July, 2013

Teresa Stanek Rea
*Acting Director of the United States Patent and Trademark Office*

(12) United States Patent
Self et al.

(10) Patent No.: US 8,457,828 B2
(45) Date of Patent: Jun. 4, 2013

(54) REMOTE CONTROL MACHINE WITH PARTIAL OR TOTAL AUTONOMOUS CONTROL

(75) Inventors: Kelvin P. Self, Stillwater, OK (US); Nathan E. Kiner, Milford, NH (US)

(73) Assignee: The Charles Machine Works, Inc., Perry, OK (US)

(*) Notice: Subject to any disclaimer, the term of this patent is extended or adjusted under 35 U.S.C. 154(b) by 1491 days.

(21) Appl. No.: 11/994,034

(22) PCT Filed: Jun. 27, 2006

(86) PCT No.: PCT/US2006/024998
§ 371 (c)(1),
(2), (4) Date: Mar. 5, 2008

(87) PCT Pub. No.: WO2007/002675
PCT Pub. Date: Jan. 4, 2007

(65) Prior Publication Data
US 2008/0208395 A1    Aug. 28, 2008

Related U.S. Application Data

(60) Provisional application No. 60/694,193, filed on Jun. 27, 2005, provisional application No. 60/694,285, filed on Jun. 27, 2005.

(51) Int. Cl.
*G05D 1/00* (2006.01)

(52) U.S. Cl.
USPC .............................. 701/24; 700/247

(58) Field of Classification Search
USPC ............ 180/401; 340/13.25, 13.2, 13.27, 340/12.5; 701/23, 24; 370/347; 455/349, 455/440; 700/247
See application file for complete search history.

(56) References Cited

U.S. PATENT DOCUMENTS

| | | | | |
|---|---|---|---|---|
| 3,639,755 | A | * | 2/1972 | Wrege ............... 246/187 B |
| 5,006,988 | A | * | 4/1991 | Borenstein et al. ........... 701/25 |
| 5,448,479 | A | * | 9/1995 | Kemner et al. ............. 701/23 |
| 5,672,044 | A | * | 9/1997 | Lemelson ............ 414/744.3 |
| 5,923,270 | A | | 7/1999 | Sampo et al. |
| 6,052,181 | A | | 4/2000 | Maynard et al. |
| 6,324,455 | B1 | | 11/2001 | Jackson |
| 7,164,970 | B2 | * | 1/2007 | Wang et al. ............... 700/245 |
| 7,597,162 | B2 | * | 10/2009 | Won ..................... 180/9.32 |
| 2003/0147727 | A1 | | 8/2003 | Fujishima et al. |

(Continued)

FOREIGN PATENT DOCUMENTS

| | | |
|---|---|---|
| DE | 19731749 A1 | 3/1999 |
| JP | 11165981 A1 | 6/1999 |

*Primary Examiner* — Thomas Black
*Assistant Examiner* — Sze-Hon Kong
(74) *Attorney, Agent, or Firm* — Tomlinson Rust McKinstry Grable

(57) ABSTRACT

A system for controlling a tool carrier and work tool from either a first remote control or a second remote control. The first remote control and the second remote control both transmit respective first and second control signals to a controller system supported on the tool carrier. The controller system is programmed to select either the first control signal or the second control signal to control operation of the tool carrier. The system may include programming to allow autonomous movement of the tool carrier between a first work zone and a second work zone. Further, the controller system may be programmed to avoid obstacles within its path and to reroute its path between the first work zone and the second work zone to avoid such obstacles.

37 Claims, 5 Drawing Sheets